United States Patent [19]

Suga et al.

[11] Patent Number: 5,270,409
[45] Date of Patent: Dec. 14, 1993

[54] PROCESS FOR PRODUCING OLEFIN POLYMER

[75] Inventors: Yoshinori Suga; Yasuo Maruyama, both of Tokyo; Fumihiko Shimizu, Yokohama, all of Japan

[73] Assignee: Mitsubishi Kasei Corporation, Tokyo, Japan

[21] Appl. No.: 827,502

[22] Filed: Jan. 27, 1992

Related U.S. Application Data

[63] Continuation of Ser. No. 523,598, May 15, 1990, abandoned.

[30] Foreign Application Priority Data

May 17, 1989 [JP] Japan ................................. 1-121580

[51] Int. Cl.⁵ .................... C08F 4/651; C08F 4/654; C08F 10/00
[52] U.S. Cl. ............................. 526/119; 502/127; 526/124; 526/351
[58] Field of Search ................ 526/121, 122, 119, 124

[56] References Cited

U.S. PATENT DOCUMENTS 4,711,940 12/1987 Yamamoto et al. ............ 526/124
4,902,761 2/1990 Suga et al. ..................... 526/119

FOREIGN PATENT DOCUMENTS 268274 5/1988 European Pat. Off. .
54-90381 7/1979 Japan .
57-2304 1/1982 Japan .
58-222103 12/1983 Japan .
58-222104 12/1983 Japan .

*Primary Examiner*—Edward J. Smith
*Attorney, Agent, or Firm*—David G. Conlin; Peter F. Corless

[57] ABSTRACT

A process for producing an olefin polymer which comprises polymerizing an olefin or copolymerizing olefins in the presence of a catalyst comprising a novel solid catalyst component (A), an organometallic compound (B) and an electron donating compound (C) is disclosed. According to the process of the present invention, an olefin polymer excellent in stereospecificity and particle property can be obtained. The catalyst used in the process of the present invention shows a very slight lowering in polymerization activity during a long-term polymerization, and therefore, the productivity of an olefin polymer can be improved.

18 Claims, 1 Drawing Sheet

(A) TRANSITION METAL COMPONENT
(SOLID CATALYST COMPONENT)

(B) ORGANOMETALLIC COMPOUND COMPONENT (C) THIRD COMPONENT

ELECTRON DONATING COMPOUND

PROCESS FOR PRODUCING OLEFIN POLYMER

This is a continuation of copending application Ser. No. 07/523,598 filed on May 15, 1990 now abandoned.

BACKGROUND OF THE INVENTION:

The present invention relates to a process for producing an olefin polymer by the use of a novel solid catalyst component. More particularly, the present invention relates to a process for producing a polymer of an α-olefin such as ethylene, propylene, butene-1, 4-methylpentene-1, and 3-methylbutene-1, particularly a polymer of an α-olefin having not less than three carbon atoms by the use of a catalyst which comprises a novel catalyst component supported on a carrier, an organometalic compound of a metal of Group I, II or III of the Periodic Table, and an electron donating compound. The catalyst used in the process of the present invention is excellent in polymerization activity and stereospecificity, shows a very slight lowering in polymerization activity and stereospecificity during a long-term polymerization, and is capable of producing a polymer having an excellent particle property.

Many proposals have been heretofore made regarding the production of a catalyst having a high activity and capable of producing a polymer of high stereospecificity from an α-olefin of at least three carbon atoms. Most of the catalysts thus proposed are not fully satisfactory in terms of polymerization activity and stereospecificity and also in particle property of the produced polymer. Further improvement, therefore, in catalyst has been desired.

The present inventors have already proposed in Japanese Patent Application Laid-Open (KOKAI) No. 64-54007(1989), a for producing a catalyst excellent in polymerization activity and stereospecificity, and capable of forming a polymer excellent in particle property, which process comprises preparing a solid catalyst component obtained by contact treatment of the reaction product of a magnesium alkoxide, a titanium alkoxide and a silicon alkoxide with a halogen-containing titanium compound and an electron donating compound and combining the solid catalyst component with an organometalic compound of a metal of Group I, II or III of Periodic Table, and optionally an electron donating compound. This catalyst, however, has a disadvantage that it causes a serious lowering of polymerization activity during a long-term polymerization (3-hour polymerization, for example). A large lowering in polymerization activity during a long-term polymerization brings about a low productivity in a process requiring a long-term polymerization condition.

In the circumstances described above, the present inventors have made a continuous study for providing a process for producing an olefin polymer by the use of a novel catalyst system excellent in polymerization activity and stereospecificity, showing a very slight lowering in polymerization activity and stereospecificity during a long-term polymerization, and capable of forming an olefin polymer excellent in particle property, and as the results, have found a solid catalyst component which meets the purpose. The present invention has been accomplished based on this finding.

SUMMARY OF THE INVENTION

The present invention provides a process for producing an olefin polymer which comprises polymerizing an olefin or copolymerizing olefins in the presence of a catalyst comprising a solid catalyst component (A), an organometalic compound (B) of a metal of Group I, II or III or Periodic Table and an electron donating compound (C). The solid catalyst component (A) is obtained by subjecting a magnesium compound (a₁) represented by the following formula:

$$Mg(OR^1)_n(OR^2)_{2-n}$$

wherein $R^1$ and $R^2$ independently represent an alkyl group, an aryl group or an aralkyl group and n represents a number satisfying $2 \geq n \geq 0$,
a titanium compound (a₂) represented by the following formula:

$$Ti(OR^3)_4$$

wherein $R^3$ represents an alkyl group, an aryl group or an aralkyl group,
a silicon compound (a₃) represented by the following formula:

$$Si(OR^4)_4$$

wherein $R^4$ represents an alkyl group, an aryl group or an aralkyl group,
and optionally, a compound (a₄) represented by the following formula:

$$R^7OH$$

wherein $R^7$ represents an alkyl group, an aryl group or an aralkyl group,
to a reaction with heating, and subjecting the resultant reaction product (a) to contact treatment with a halogen-containing titanium compound (b) represented by the following formula:

$$TiX_m(OR^5)_{4-m}$$

wherein X represents a halogen, $R^5$ represents an alkyl group, an aryl group or an aralkyl group and m represents a number satisfying $4 \geq m > 0$,
and an electron donating compound (c) represented by the following formula:

$$R^6_p(COO)_qM_rY_s$$

wherein $R^6$ represents an alkyl group, an aryl group or an aralkyl group, M represents Ti, B or Ge, Y represents a hydrocarbon group or an inorganic anion, p represents a number satisfying $p \geq 1$, and q,r and s respectively represents a number of not less than 0 satisfying the following equation:

$$rx = ys + q$$

wherein x represents the valence of M and y represents the valence of Y.

Figure 1:
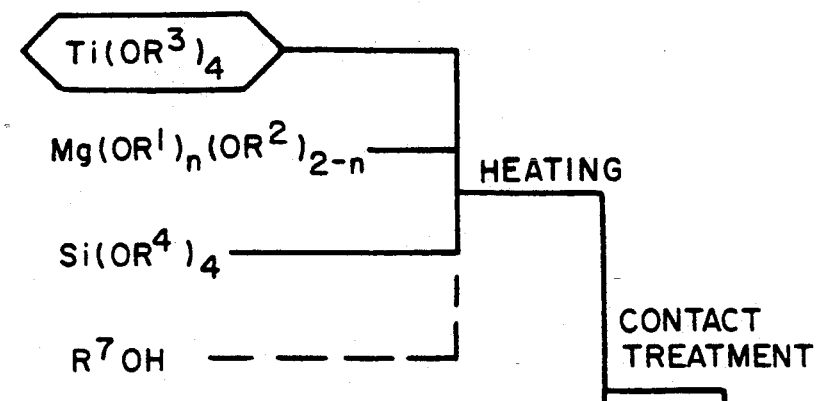
FIG. 1 shows a flow chart of the production of the catalyst used in the process of the present invention.
Figure 1:
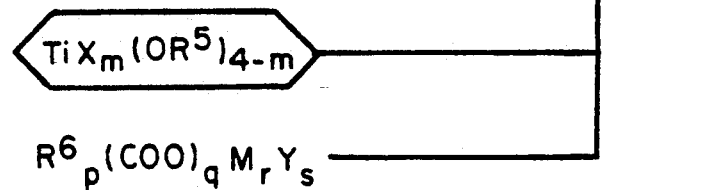
Figure 1:
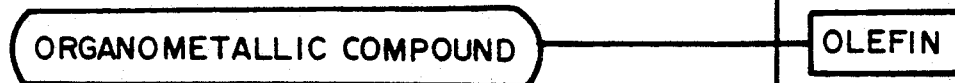

DETAILED DESCRIPTION OF THE INVENTION:

The magnesium compound (a₁) represented by the formula:

$$Mg(OR^1)_n(OR^2)_{2-n}$$

which is used in the present invention may include a dialkoxy magnesium, a diaryloxy magnesium and an alkyloxyaryloxy magnesium, and specifically, Mg(OCH₃)₂, Mg(OC₂H₅)₂, Mg(OC₃H₇)₂, Mg(OC₄H₉)₂, Mg(OC₆H₅)₂, Mg(OCH₂C₆H₅)₂, Mg(OC₂H₅)(OC₄H₉), Mg(OC₆H₅)(OC₄H₉), Mg(OC₂H₅)(OC₆H₅), Mg(OC₆H₄CH₃), etc. These magnesium compounds may be used singly or in combination.

The titanium compound (a₂) represented by the formula:

$$Ti(OR^3)_4$$

may include Ti(OCH₃)₄, Ti(OC₂H₅)₄, Ti(OC₃H₇)₄, Ti(OC₄H₉)₄, Ti(OC₆H₅)₄, Ti(OCH₂C₆H₅)₄, etc. These titanium compounds may be used alone or in combination.

The silicon compound (a₃) represented by the formula:

$$Si(OR^4)_4$$

may include Si(OCH₃)₄, Si(OC₂H₅)₄, Si(OC₃H₇)₄, Si(OC₄H₉)₄, Si(OC₆H₅)₄, Si(OC₆H₄CH₃)₄, etc. These silicon compounds may be used alone or in combination.

The compound (a₄) represented by the formula:

$$R^7OH$$

may include alcohols such as C₂H₅OH, i-C₃H₇OH, n-C₃H₇OH, n-C₄H₉OH, i-C₄H₉OH, n-C₆H₁₃OH, n-C₈H₁₇OH, n-C₄H₉CH(C₂H₅)CH₂OH and C₆H₅CH₂OH, and phenols such as phenol, cresol, xylenol and butyl phenol.

It is preferred that at least one of the magnesium compound, the titanium compound, the silicon compound and the compound of the formula R⁷OH has an aryloxy group.

The method for obtaining the reaction product (a) of the three or four compounds, i.e., the magnesium compound (a₁), the titanium compound (a₂), the silicon compound (a₃), and optionally the compound (a₄) of the formula R⁷OH, may include a method wherein (a₁), (a₂), (a₃), and optionally (a₄) are subjected to simultaneous contact reaction, a method wherein (a₄) is optionally reacted after the reaction of (a₁), (a₂) and (a₃), a method wherein (a₃) and optionally (a₄) are reacted after the reaction of (a₁) and (a₂), a method wherein (a₃) is reacted after (a₁), (a₂) and optionally (a₄), etc. Thus, there is no limitation in the order of the compounds to be reacted. In the reaction, an inert hydrocarbon solvent such as hexane, heptane, pentane, butane, toluene, xylene, etc. The reaction temperature is 60° to 200° C., preferably 100° to 150° C., and the reaction time is about 0.5 to 4 hours.

The molar ratio of the compounds to be reacted is 0.05 to 4 preferably 0.2 to 1 for Ti(OR³)₄, 0.1 to 5 preferably 0.2 to 2 for Si(OR⁴)₄, 0.1 to 5 preferably 1 to 3 for R⁷OH optionally used, based on one mol of Mg(OR¹)ₙ(OR²)₂₋ₙ.

The reaction product of the magnesium compound (a₁), the titanium compound (a₂), the silicon compound (a₃), and the compound (a₄) optionally used, can be obtained in a liquid state depending on the ratio of (a₁), (a₂), (a₃) and optional (a₄). Particularly desirable result, however, can be obtained when a slurry reaction product containing solid product is used.

The solid catalyst component (A) is obtained by subjecting the reaction product (a) which is obtained as described above to contact treatment with the halogen-containing titanium compound (b) and the electron donating compound (c) in the presence or absence of an inert hydrocarbon solvent such as hexane, heptane, pentane, heptane, toluene, etc.

The halogen-containing titanium compound may include TiCl₄, TiBr₄, TiI₄, an alkoxyhalogenotitanium. Of these compounds, TiCl₄ and the alkoxyhalogenotitanium are preferably used.

The electron donating compound (c) is represented by the formula:

$$R^6_p(COO)_qM_rY_s$$

wherein R⁶ is an alkyl group, an aryl group or an aralkyl group, preferably an aryl group, M is Ti, B or Ge, Y is a hydrocarbon group or an inorganic anion, each of q, r and s is a number of not less than 0 satisfying the following equation:

$$rx = ys + q$$

wherein x is the valence of M and y is the valence of Y, and p is a number satisfying p ≧ 1. Specifically, the electron donating compound (c) includes a carboxylic acid derivative such as o-C₆H₄(COOBCl₂)₂, (o-C₆H₄)₃(COO)₆B₂, o-C₆H₄[COOGe(CH₃)₃]₂, o-C₆H₄(COO)₂TiCl₂, etc.

In the present invention, the contact treatment of the components (a), (b) and (c) is carried out by the following method:

(i) (a) is treated with (b) and (c), (ii) (a) and (b) is previously subjected to contact treatment, and then treated with (c), and (iii) (a) and (c) is previously subjected to contact treatment, and then treated with (b). There is no limitation in the order of (a), (b) and (c) to be treated, however, the method (i) and (ii) is preferred to the method (iii). The treatment with (b) and/or (c) may be preferably repeated twice or more.

After the contact treatment (a), (b) and (c), the resultant product is washed with an inert hydrocarbon solvent or halogenated hydrocarbon such as hexane, heptane, pentane, butane, toluene and chlorobenzene to remove the component soluble in the solvent, thereby obtaining the solid catalyst component (A).

The molar amounts of the components (b) and (c) to be used in the production process of the catalyst based on one mol of the magnesium compound in the component (a) are:

Halogen-containing titanium compound (b): 0.1 to 100 mol, preferably 1 to 40 mol, and Electron donating compound (c): 0.01 to 10 mol, preferably 0.01 to 1 mol.

Further, it is preferred to select the amount of each of the components (a), (b) and (c) so that the content of titanium in the solid catalyst component (A) is within the range of 0.1 to 10 weight %, preferably 0.5 to 5 weight %.

The temperature for the contact treatment of the components (a), (b) and (c) is usually in the range of −70° to 200° C., preferably −30° to 150° C. More specifically, in the case where the components (a) and (b) are subjected to contact treatment and then further treated with the component (c), a highly satisfactory result can be obtained when the contact treatment of the components (a) and (b) is carried out at a temperature of −70° to 50° C., preferably −30° to 30° C., and the subsequent treatment with the component (c) is carried out at a temperature of 50° to 200° C., preferably 70° to 150° C. Also, in the case where the components (a), (b) and (c) are simultaneously subjected to contact treatment, a highly satisfactory result can be obtained when the treatment is carried out at a temperature of −70° to 50° C., preferably −30° to 30° C., and then the product is heated to a temperature of 50° to 200° C., preferably 70° to 150° C.

When the contact treatment of the components (a) and (b) or (a), (b) and (c) is carried out at a temperature as low as described above, the entire reaction mixture is easily allowed to become a homogeneous liquid. By heating this homogeneous liquid mixture to precipitate a solid matter, a solid catalyst component (A) highly excellent in particle property can be obtained.

The contact treatment of the components (a), (b) and (c) is carried out in the presence or absence of an inert solvent such as hexane, heptane, pentane, butane, toluene and chlorobenzene. The time for this treatment is about 0.5 to 6 hours.

The olefin polymer is produced by polymerizing an olefin or copolymerizing olefins in the presence of a catalyst obtained by mixing the solid catalyst component (A) obtained as described above with the organometallic compound (B) of a metal of Group I, II or III of Periodic Table and the electron donating compound (C).

The organometallic compound (B) of a metal of Group I, II or III of Periodic Table used in the catalyst may include an organolithium compound, an organopotassium compound, an organomagnesium compound, an organoaluminum compound, etc. Of these compounds, a compound represented by the following formula:

$$AlR^8{}_m X_{3-m}$$

wherein $R^8$ represents a hydrocarbon group of 1 to 20 carbon atoms, preferably an aliphatic hydrocarbon group of 1 to 20 carbon atoms, X represents a halogen and m represents a number of 2 to 3, is preferred. As the examples of the compound of $AlR^8{}_m X_{3-m}$, are mentioned $Al(C_2H_5)_3$, $Al(n-C_3H_7)_3$, $Al(i-C_4H_9)_3$, $Al(n-C_6H_{13})_3$, $Al(n-C_8H_{17})_3$, $Al(CH=CH_2)(C_2H_5)_2$, $Al(C_2H_5)_2Cl$, etc. A trialkylaluminum is preferably used.

The electron donating compound (C) may include a phosphorus-containing compound, an oxygen-containing compound, a sulfur-containing compound, a nitrogen-containing compound and a silicon-containing compound. Of these compounds, a nitrogen-containing compound, an oxygen-containing compound and a silicon-containing compound are preferably used.

The nitrogen-containig compound may include amines or derivatives thereof such as $(C_2H_5)_3N$, $H_2N(CH_2)_2NH_2$, $(i-C_3H_7)_2NH$, $(t-C_4H_9)_2NH$, pyridine and piperidine, and nitroso compounds such as N-oxides of tertiary amines, pyridines or quinolines. Of these compounds, a piperidine derivative such as 2,2,6,6-tetramethylpiperidine is preferably used.

The oxygen-contaning compound may include a compound represented by the following formula:

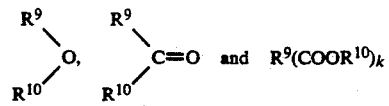

wherein $R^9$ and $R^{10}$ independently represent a hydrocarbon group which may be substituted with an alkyl group, a hydroxyl group or an alkoxyl group, or $R^9$ and $R^{10}$ may combine to form a cyclic group, and k represents a number from 1 to 3. Specifically, are exemplified ethers such as diethyl ether, dipropyl ether, diethylene glycol, ethylene oxide, propylene oxide, tetrahydrofuran and 2,2,5,5-tetramethyltetrahydrofuran, ketones such as acetone, diethyl ketone, methyl ethyl ketone, methyl isobutyl ketone and phenyl propyl ketone, carboxylic esters such as ethyl phenylacetate, methyl benzoate, methyl toluate, methyl anisate, ethyl anisate, methyl ethoxybenzoate and ethyl cinnamate, cyclic esters such as t-butylolactone, and β-trimethoxysilylethyl benzoate. Ethers or esters of aromatic carboxylic acid are preferably used.

The silicon-containing compound may include a compound represented by the following formula:

$$R^{11}{}_n X_m Si(OR^{12})_{4-n-m}$$

wherein $R^{11}$ and $R^{12}$ independently represent a hydrocarbon group which may be substituted with an alkyl group, X represents a hydrogen atom or halogen atom, and each of n and m represents a number from 0 to 4. As the example of the silicon-containing compound, are mentioned $(C_2H_5)_2Si(OCH_3)_2$, $C_6H_5Si(OCH_3)_3$, $(C_6H_5)_2Si(OCH_3)_2$, $C_6H_5Si(OC_2H_5)_3$, $C_6H_5SiCl(OCH_3)_2$, $C_6H_5SiH(OCH_3)_2$ and $Si(OC_2H_5)_4$. Of these compounds, a hydrocarbylalkoxysilane such as $(C_6H_5)_2Si(OCH_3)_2$ and $C_6H_5Si(OC_2H_5)_3$ is preferred.

When a dicarboxylic acid derivative is used as the electron donating compound (c), a nitrogen-containing compound or a silicon-containing compound is preferably used as the electron donating compound (C), and more preferably a piperidine derivative is used.

The solid catalytic component (A), the organometallic compound (B) and the electron donating compound are mixed by a conventional manner in such as ration that the molar ratio of titanium in the solid catalyst component (A), the organometallic compound (B) and the electron donating compound (C) is 1:3 to 1000:0.1 to 100, preferably 1:10 to 300:1 to 50.

As the olefin which is subjected to polymerization or copolymerization, may be mentioned ethylene, propylene, butene-1, 3-methylbutene-1, 4-methylpentene-1, etc. An α-olefin having not less than three carbon atoms, especially, propylene is preferred. The process of the present invention can be preferably applied to random copolymerization and block copolymerization as well as homopolymerization.

As the polmymerization method, there may be mentioned slurry polymerization wherein an inert hydrocarbon such as hexane, heptane, toluene, oentane and butane, a mixture therof and a liquefied α-olefin which is subjected to polymerization are used as the solvent; bulk polymerization; and gas phase polymerization.

The polymerization temperature is 50° to 100° C., preferably 60° to 90° C. As for the polymerization pressure, there is no specific limitation, however, preferably selected from the range from atmospheric pressure to 100 atm. Further, hydrogen may be presented in the polymerization system as a molecular weight modifier.

In the process of the present invention, any of techniques usually employed in conventional polymerization or copolymerization of respective α-olefin may be also applied. For example, is mentioned a method wherein α-olefin is subjected to prepolymerization by using three catalyst components (A), (B) and (C) or two catalyst components (A) and (B), and then, subjected to main polymerization at a temperature higher than the prepolymerization temperature. In this method, the amount of the prepolymerization is about 0.1 to 100 g based on 1 g of the solid catalyst component (A), and practically, 1 to 3 g is sufficient. The catalyst component used in the prepolymerization may be used in the main polymerization after or without washing with an inert hydrocarbon such as hexane.

The present invention will be described more in detail while referring the following non-limitative examples.

In the following Examples, the term "polymerization activity" (indicated by K) refers to the amount (g) of the polymer produced per one hour, per 1 kg/cm2 of α-olefin pressure and per 1 g of the solid catalyst component (A). The term "catalytic efficiency" (indicated as CE) refers to the amount (g) of the polymer produced per 1 g of the solid catalyst component (A).

The term "isotactic index" (indicated as II) refers to the residual amount (% by weight) after 6-hour extraction in a modified Soxhlet's extractor with boiling n-heptane.

The bulk density (indicated as $p_B$ in g/cc) was determined in accordance with Japanese Industrial Standard (JIS) K-6721. Melt flow index (MFI) was determined in accordance with ASTM-D-1238.

The particle size distribution of the polymer was determined with standard sieves made by Mitamura Riken K.K.

EXAMPLE 1

(1) Preparation of the solid catalytic component (A)

A 500 ml flask equipped with a stirrer and a thermometer was thoroughly replaced with refined $N_2$ gas and under refined $N_2$ seal, 5 g of commercially available $Mg(OC_2H_5)_2$ was placed therein, and then, were added 7.4 g of $Ti(OC_4H_9)_4$ and 4.6 g of $Si(OC_2H_5)_4$. The content was stirred and heated. When the temperature was raised to 130° C., a toluene solution of 8.2 g of phenol was added and the content was allowed to react at 130° C. for one hour to obtain a yellow slurry reaction product (a).

After the reaction, refined toluene was added to the reaction product in such an amount that the concentration of Mg is 0.5 mmol/ml of toluene, then, cooled to −20° C. and 25 g of $TiCl_4$ was added. After the addition, the entire reaction mixture changed to a homogeneous liquid state. The temperature was gradually raised to 110° C. and 0.75 g of o-$(C_6H_4)_3(COO)_6B_2$ was added, then, kept at 110° C. for one hour. Here, a white crystal of o-$(C_6H_4)_3(COO)_6B_2$ was used, which was obtained in accordance with the method in A. Pictet und A. Gelenznoff, Ber., 36, 2219(1903), i.e., by mixing phthalic anhydride and boric acid in a molar ratio of 3:2 and heated and melted to effect reaction. The resultant reaction mixture was then washed with refined toluene, to obtain a solid product. The solid product was treated with 42 g of $TiCl_4$ at 110° C. for one hour, then washed with refined toluene to obtain 4.3 g of a solid catalyst component (A). (2) Polymerization of propylene In an induction stirring type 2-litre autoclave which was thoroughly replaced with refined argon gas, were added 0.5 mmol of triethylaluminum and 0.05 mmol of 2,2,6,6-tetramethylpiperidine at room temperature under argon seal. Then, $H_2$ was introduced at room temperature thereinto in such an amount that the pressure of $H_2$ was 0.3 kg/cm$^2$ and 700 g of liquid propylene was added. After adding 9 mg of the solid catalyst component (A) obtained above, the temperature was raised to 70° C. and polymerization was carried out for one hour. Thereafter, the excess propylene was purged to obtain 353 g powdery polypropylene. The catalytic efficiency (CE) was 39200 g-PP/g-cat and polymerization activity (K) was 1310. II was 97.1%, MFI was 3.4 g/10 min and $p_B$ was 0.44 g/cc. The polypropylene thus obtained showed a very narrow particle size distribution. The particles having a particle size of 250 to 500 μm amounted to 98% of the whole powder. The minute particles having a particle size of less than 100 μm amounted to 0.1%.

EXAMPLE 2

Polymerization of propylene was carried out in the same manner as in Example 1(2), except for using 0.3 mmol of triethylaluminum, 0.03 mmol of 2,2,6,6-tetramethylpiperidine and 5.4 mg of the solid catalyst component obtained in Example 1 to produce a polypropylene having II of 97.3%, MFI of 2.6 g/10 min and $p_B$ of 0.44 g/cc. The catalytic efficiency (CE) was 35900 g-PP/g-cat and the polymerization activity (K) was 1200.

EXAMPLE 3

Polymerization of propylene was carried out in the same manner as in Example 2 except for changing the polymerization time to 3 hours to obtain a polypropylene having II of 95.7%, MFI of 3.1 g/10 min and $p_B$ of 0.43 g/cc. The catalytic efficiency (CE) was 82800 g-PP/g-cat and the polymerization activity (K) was 920. The lowering in the polymerization activity during a long-term polymerization was very slight.

EXAMPLE 4

Polymerization of propylene was carried out in the same manner as in Example 1(2) except for 0.075 mmol of 2,2,6,6-tetramethylpiperidine to obtain a polypropylene having II of 97.2%, MFI of 3.1 g/10 min and $p_B$ of 0.45 g/cc. The catalytic efficiency (CE) was 46200 g-PP/g-cat and the polymerization activity (K) was 1540.

COMPARATIVE EXAMPLE 1

(1) Production of the solid catalyst component (A)

The same procedure as in Example 1(1) was repeated except for using 1.3 g of ethyl benzoate as the electron donating compound (c) to obtain 4.8 g of a solid catalyst component (A).

(2) Polymerization of propylene

Polymerization was carried out in the same manner as in Example 1(2) using 9 mg of the solid catalyst component obtained above to obtain polypropylene. The catalytic efficiency (CE) was 49500 g-PP/g-cat, the polymerization activity (K) was 1650 and II was 77.6%.

COMPARATIVE EXAMPLE 2

(1) Production of the solid catalyst component (A)

The same procedure as in Example 1(1) was repeated except for using 1.3 g of $(C_6H_5COO)_2AlOH$ as the electron donating compound (c) to obtain 4.9 g of a solid catalyst component (A).

(2) Polymerization of propylene

Polymerization was carried out in the same manner as in Example 1(2) except for using 9 mg of the solid catalyst component (A) obtained above, 0.15 mmol of methyl p-toluate and 1.1 kg/cm² of $H_2$ to obtain polypropylene. The catalytic efficiency was 22500 g-PP/g-cat, the polymerization activity (K) was 750 and II was 96.7%.

COMPARATIVE EXAMPLE 3

(1) Production of the solid catalyst component (A)

The same procedure as in Example 1(1) was repeated except for using 0.9 g of $o\text{-}C_6H_4(COONa)_2$ as the electron donating compound (c) to obtain 6.1 g of a solid catalyst component (A).

(2) Polymerization of propylene

Polymerization was carried out in the same manner as in Example 1(2) using 9 mg of the solid catalyst component obtained above to obtain polypropylene. The catalytic efficiency (CE) was 21000 g-PP/g-cat, the polymerization activity (K) was 700 and II was 97.2%.

COMPARATIVE EXAMPLE 4

(1) Production of the solid catalyst component (A)

A 500 ml flask equipped with a stirrer and a thermometer was thoroughly replaced with refined $N_2$ gas, and then, were added therein 5 g of $Mg(OC_2H_5)_2$, 7.4 g of $Ti(OC_4H_9)_4$, 4.6 g of $Si(OC_2H_5)_4$, 0.75 g of $o\text{-}(C_6H_4)_3(COO)_6B_2$, a toluene solution of 8.2 g of phenol and 25 g of $TiCl_4$. The temperature was raised to 110° C. and kept for one hour. The reaction mixture was washed with refined toluene to obtain a solid product. The solid product was treated with 42 g of $TiCl_4$ at 110° C. for one hour, and then, thoroughly washed with refined toluene to obtain 5.1 g of a solid catalyst component (A).

(2) Polymerization of propylene

Polymerization was carried out in the same manner as in Example 1(2) using 9 mg of the solid catalyst component (A) obtained above to obtain polypropylene. The catalytic efficiency (CE) was 15000 g-PP/g-cat, the polymerization activity (K) was 500, II was 93.0%, MFI was 8.3 g/10 min and $\rho_B$ was 0.30 g/cc. The produced polypropylene showed a wide particle size distribution and the amount of minute particles having a particle size of less than 100 μm was 5.6%.

EXAMPLE 5

(1) Production of the solid catalyst component (A)

The same procedure as in Example 1(1) was repeated except for using 1.8 g of $o\text{-}C_6H_4[(COOGe(CH_3)_3]_2$ as the electron donating compound (c) to obtain 4.3 g of a solid catalyst component (A).

(2) Polymerization of propylene

Polymerization was carried out in the same manner as in Example 1(2) using 9 mg of the solid catalyst component obtained above to obtain polypropylene. The catalytic efficiency (CE) was 57000 g-PP/g-cat, the polymerization activity (K) was 1900 and II was 96.4%.

EXAMPLE 6

(1) Production of the solid catalyst component (A)

The same procedure as in Example 1(1) was repeated except for using 3.1 g of $o\text{-}C_6H_4(COOTiCl_3)_2$ as the electron donating compound (c) to obtain 4.4 g of a solid catalyst component (A).

(2) Polymerization of propylene

Polymerization was carried out in the same manner as in Example 1(2) using 9 mg of the solid catalyst component obtained above to obtain polypropylene. The catalytic efficiency (CE) was 39800 g-PP/g-cat, the polymerization activity (K) was 1330 and II was 97.7%.

EXAMPLE 7

(1) Polymerization of propylene

Polymerization was carried out in the same manner as in Example 1(2) except for using 9 mg of the solid catalyst component obtained in Example 6 and 0.05 mmol of $(C_6H_5)_2Si(OCH_3)_2$ as the electron donating compound (C) to obtain polypropylene. The catalytic efficiency (CE) was 31100 g-PP/g-cat, the polymerization activity (K) was 1040 and II was 98.3%.

COMPARATIVE EXAMPLE 5

(1) Production of the solid catalyst component (A)

The same procedure as in Example 1(1) was repeated except for using 1.2 g of $o\text{-}C_6H_4(COOMgCl)_2$ as the electron donating compound (c) to obtain 5.7 g of a solid catalyst component (A).

(2) Polymerization of propylene

Polymerization was carried out in the same manner as in Example 1(2) using 9 mg of the solid catalyst component obtained above to obtain polypropylene. The catalytic efficiency (CE) was 44000 g-PP/g-cat, the polymerization activity (K) was 1470 and II was 92.5 %.

COMPARATIVE EXAMPLE 6

(1) Production of the solid catalyst component (A)

The same procedure as in Example 1(1) was repeated except for using 0.97 g of diethyl phthalate as the electron donating compound (c) to obtain 5.1 g of a solid catalyst component (A).

(2) Polymerization of propylene

Polymerization was carried out in the same manner as in Example 1(2) using 9 mg of the solid catalyst component obtained above to obtain polypropylene. The catalytic efficiency (CE) was 27000 g-PP/g-cat, the polymerization activity (K) was 900 and II was 95.8%

What is claimed is:

1. A process for producing an olefin polymer, which comprises polymerizing an olefin or copolymerizing olefins in the presence of a catalyst comprising (A) a solid catalyst component obtained by subjecting a magnesium compound ($a_1$) represented by the following formula:

$$Mg(OR^1)_n(OR^2)_{2-n}$$

wherein $R^1$ and $R^2$ independently represent an alkyl group, an aryl group, or an aralkyl group and n represents a number satisfying $2 \geq n \geq 0$, a titanium compound ($a_2$) represented by the following formula:

$$Ti(OR^3)_4$$

wherein $R^3$ represents an alkyl group, an aryl group, or an aralkyl group, and a silicon compound (a₃) represented by the following formula:

$$Si(OR^4)_4$$

wherein $R^4$ represents an alkyl group, an aryl group, or an aralkyl group, to a reaction with heating, and subjecting the resultant reaction product (a) to contact treatment with a halogen-containing titanium compound (b) represented by the following formula:

$$TiX_m(OR^5)_{4-m}$$

wherein X represents a halogen, $R^5$ represents an alkyl group, an aryl group or an aralkyl group, and m represents a number satisfying $4 \geq m > 0$, and an electron donating compound (c) represented by the following formula:

$$R^6_p(COO)_q M_r Y_s$$

wherein $R^6$ represents an alkyl group, an aryl group or an aralkyl group, M represents Ti, B or Ge, Y represents a hydrocarbon group or an inorganic anion, p, q, r and s respectively represent a number satisfying the following conditions:

$p \geq 1$ $q > 0$ $r > 0$ $s \geq 0$ $rx = ys + q$ wherein x represents the valence of M and y represents the valence of Y;

(B) an organometallic compound of a metal of Groups I, II or III of the Periodic Table; and (C) an electron donating compound selected from the group consisting of a piperidine derivative and a silicon-containing compound represented by the following formula:

$$R^{11}_n X_n Si(OR^{12})_{4-n-m}$$

wherein $R^{11}$ and $R^{12}$ independently represent a hydrocarbon group which may be substituted with an alkyl group, X represents a hydrogen atom or halogen atom, and each of n and m represents a number from 0 to 4.

2. A process according to claim 1, wherein the reaction with heating of said magnesium compound (a₁), said titanium compound (a₂) and said silicon compound (a₃) is carried out in the presence of a compound (a₄) represented by the following formula:

$$R^7OH$$

wherein $R^7$ represents an alkyl group, an aryl group or an aralkyl group.

3. A process according to claim 2, wherein at least one of the compound (a₁), the compound (a₂), the compound (a₃) and the compound (a₄) has an aryloxy group.

4. A process according to claim 1, wherein the magnesium compound (a₁) is a dialkoxy magnesium.

5. A process according to claim 1, wherein the molar ratio of (a₁)/(a₂)/(a₃) is 1/0.05 to 4/0.1 to 5.

6. A process according to claim 1, wherein the molar ratio of (a₁)/(a₂)/(a₃) is 1/0.2 to 1/0.2 to 2.

7. A process according to claim 2, wherein the compound (a₄) is used in an amount of 0.1 to 5 mole based on one mole of the compound (a₁).

8. A process according to claim 2, wherein the compound (a₄) is used in an amount of 1 to 3 mole based on one mole of the compound (a₁).

9. A process according to claim 1, wherein the molar ratio of the magnesium compound (a₁) in the reaction product (a), the halogen-containing compound (b), and the electron donating compound (c) is (a₁)/(b)/(c) = 1/0.1 to 100/0.01 to 10.

10. A process according to claim 1, wherein the molar ratio of the magnesium compound (a₁) in the reaction product (a), the halogen-containing compound (b), and the electron donating compound (c) is (a₁)/(b)/(c) = 1/1 to 40/0.01 to 1.

11. A process according to claim 1, wherein said solid catalyst component (A) is obtained by subjecting the reaction product (a) and the halogen-containing compound (b) to contact treatment at a temperature in the range of −70° to 50° C. and then subjecting the resultant product to contact treatment with the electron donating compound (c) at a temperature in the range of 50° to 200° C.

12. A process according to claim 1, wherein said solid catalyst component (A) is obtained by subjecting the reaction product (a) and the halogen-containing compound (b) to contact treatment at a temperature in the range of −30° to 30° C. and then subjecting the resultant product to contact treatment with the electron donating compound (c) at a temperature in the range of 70° to 150° C.

13. A process according to claim 1, wherein said solid catalyst component (A) is obtained by subjecting the reaction product (a), the halogen-containing compound (b) and the electron donating compound (c) to simultaneous contact treatment at a temperature in the range of −70° to 50° C. and then heating the resultant product to a temperature in the range of 50° to 200° C.

14. A process according to claim 1, wherein said solid catalyst component (A) is obtained by subjecting the reaction product (a), the halogen-containing compound (b) and the electron donating compound (c) to simultaneous contact treatment at a temperature in the range of −30° to 30° C. and then heating the resultant product to a temperature in the range of 70° to 150° C.

15. A process according to claim 1, wherein said organometallic compound (B) is represented by the following formula:

$$AlR^8_m X_{3-m}$$

wherein $R^8$ represents a hydrocarbon group of 1 to 20 carbon atoms, X represents a halogen atom, and m represents a number in the range of 2 to 3.

16. A process according to claim 1, wherein said organometallic compound (B) is a trialkylaluminum.

17. A process according to claim 1, wherein the molar ratio of the solid catalyst component (A), the organometallic compound (B) and the electron donating compound (C) is (A)/(B)/(C) = ½ to 1,000/0.1 to 100.

18. A process according to claim 1, wherein the molar ratio of the solid catalyst component (A), the organometallic compound (B) and the electron donating compound (C) is (A)/(B)/(C) = 1/10 to 300/1 to 50.

* * * * *